United States Patent [19]
Geary

[11] 3,791,231
[45] Feb. 12, 1974

[54] TURBINE TURNING MECHANISM
[75] Inventor: Carl H. Geary, Greensburg, Pa.
[73] Assignee: Carrier Corporation, Syracuse, N.Y.
[22] Filed: Apr. 3, 1972
[21] Appl. No.: 240,603

[52] U.S. Cl............ 74/142, 192/104 C, 192/84 PM
[51] Int. Cl............................................. F16h 27/02
[58] Field of Search...... 74/142; 192/114 R, 104 C, 192/84 PM

[56] References Cited
UNITED STATES PATENTS

| | | | |
|---|---|---|---|
| 2,893,057 | 7/1959 | Rekettye............................ | 74/142 X |
| 2,640,359 | 6/1953 | Gilbert et al...................... | 192/104 C |
| 2,863,320 | 12/1958 | Mendenhall...................... | 192/104 C |
| 2,809,535 | 10/1957 | Hein et al. ....................... | 192/114 R |
| 3,303,709 | 2/1967 | Slisz et al.............................. | 74/142 |

Primary Examiner—Benjamin W. Wyche
Assistant Examiner—Wesley S. Ratliff, Jr.
Attorney, Agent, or Firm—D. Emmett Thompson

[57] ABSTRACT

A fluid operated piston and cylinder structure is employed to impart intermittent rotation to a steam turbine subsequent to shutdown. Preferably the motion transmitting means between the piston and cylinder structure and the turbine shaft consists of a ratchet wheel fixed to the shaft and a pawl operated by the piston and cylinder. Means is provided to restrain movement of the pawl into engagement with the ratchet when the turbine is operating. Preferably the pawl restraining means is operated automatically upon the turbine reaching a predetermined speed.

3 Claims, 6 Drawing Figures

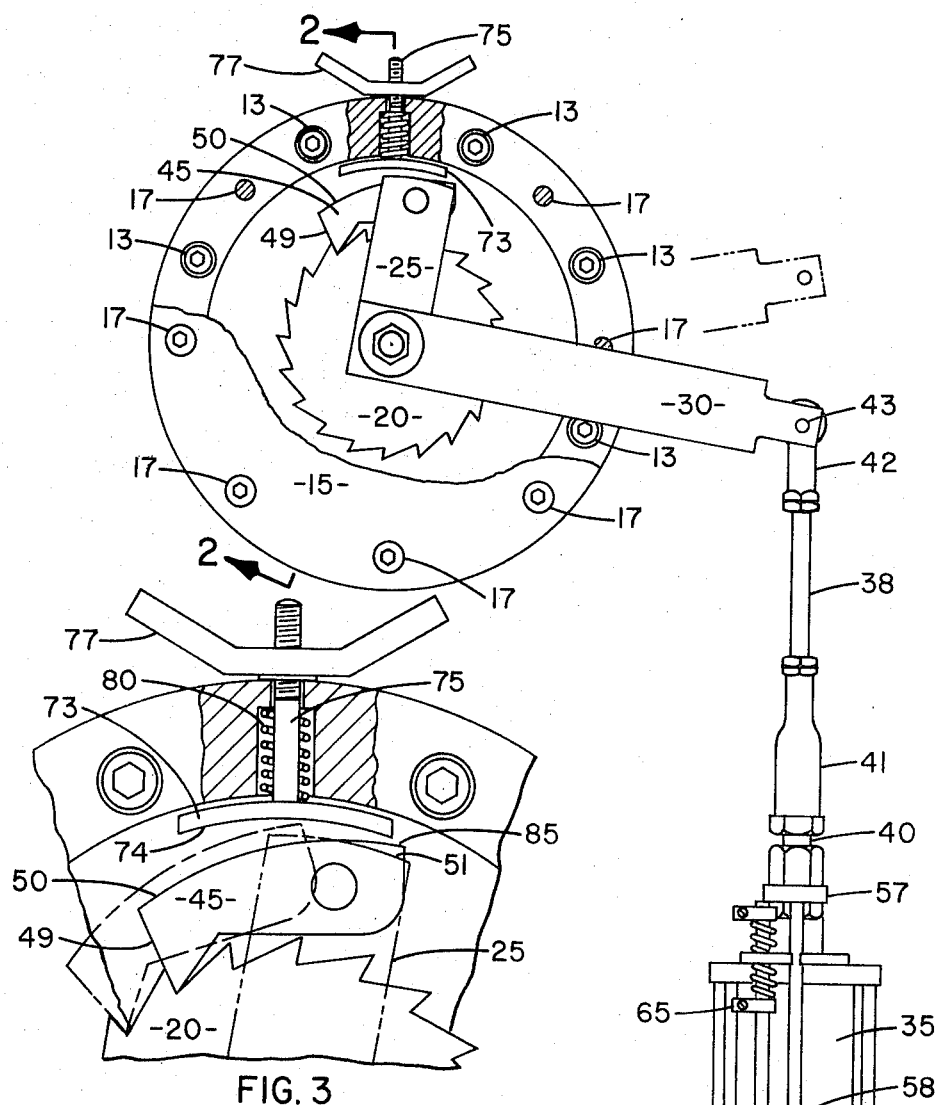
FIG. 3
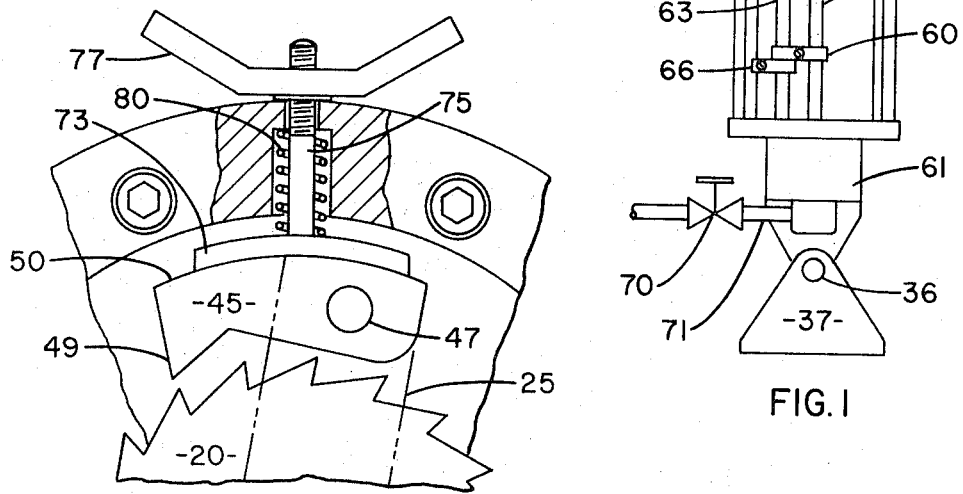
FIG. 4
FIG. 1

TURBINE TURNING MECHANISM

BACKGROUND OF THE INVENTION

The necessity of rotating steam turbine rotors at very slow speed following shutdown of the machine is well understood. Conventionally an electric motor is connected to the turbine shaft through reduction gearing. The motor may be energized and the gearing engaged and disengaged manually or automatically. The arrangement involving the electric motor and the reduction gearing involves a substantial investment and, of course, is not operable in the event of an electric power failure at the same time that the steam supply is discontinued to the turbine for any reason. This invention is directed to a turbine turning mechanism embodying a structure particularly economical to build and which may be operated by a standby pressurized fluid supply.

SUMMARY OF THE INVENTION

A conventional fluid operated piston and cylinder structure of the continuous cycling type is connected to an arm structure carrying a pawl engaging the teeth of a ratchet wheel fixed to the turbine shaft. Upon reciprocation of the arm structure, intermittent rotation is imparted to the turbine shaft. A pawl retaining means is adjustable to maintain the pawl out of engagement with the ratchet wheel teeth during normal operation of the turbine. In a modified form, centrifugal means carried by the ratchet wheel is provided for flipping the pawl into the effective field of a permanent magnet when the turbine is started up.

BRIEF DESCRIPTION OF THE DRAWINGS

FIG. 1 is an end elevational view of a turning mechanism embodying my invention with parts broken away and parts in section;

FIG. 3 is an enlarged view of the upper portion of FIG. 1;

FIG. 4 is a view similar to FIG. 3 showing the pawl restraining shoe moved into engagement with the pawl to restrain the same from engaging the ratchet wheel teeth;

DESCRIPTION OF THE PREFERRED EMBODIMENT

Figure 2:
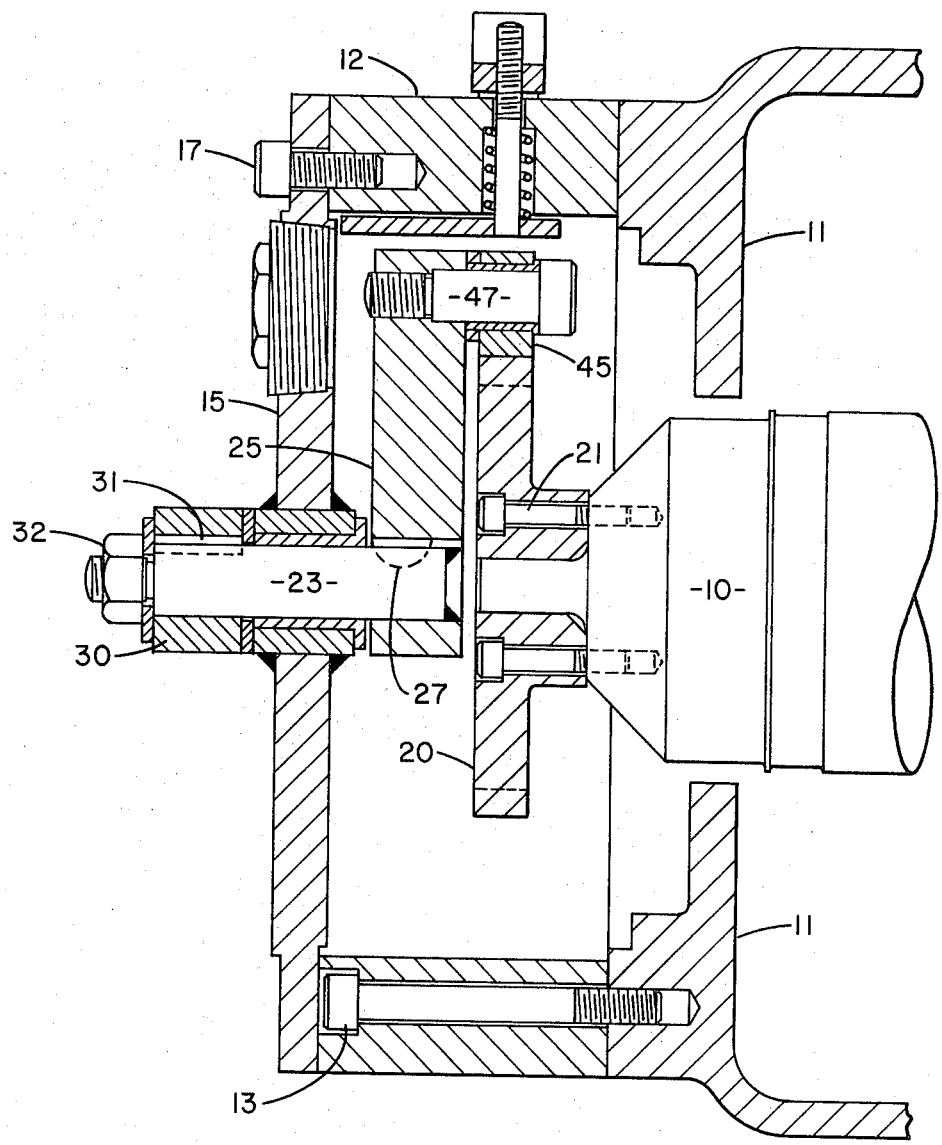
FIG. 2 is a view taken on line 2—2, FIG. 1.

Referring to FIGS. 1 and 2, the end of the turbine shaft 10 projects through the end wall 11 of the turbine casing. A cylindrical side wall member 12 is attached to the wall 11 as by screws 13. An end plate 15 is attached to the cylindrical casing member 12 as by screws 17. A ratchet wheel 20 is fixed to the turbine shaft 10 as by screws 21. A shaft 23 is journaled in the end plate 15. An arm member 25 is fixed to the inner end of the shaft 23 as by key 27.

An arm 30 is fixed to the outer end of the shaft 23 as by key 31 and nut 32. In FIG. 1 a substantial portion of the end plate 15 is broken away to better show the arm structure.

A fluid operated cylinder 35 is pivotally mounted, at one end at 36, to a fixed bracket 37. A rod 38 is fixed to the piston rod 40 by a coupling 41. The upper end of the rod 38 is attached to a rod end 42 pivotally connected at 43 to the outer end of the arm 30.

A pawl 45 is pivotally mounted intermediate its ends on a stud 47 fixed to the outer end of the arm 25. The pawl 45 is formed at one end with a tooth engaging portion 49. The outer edge surface 50 of the pawl 45 is of arcuate form. The center of the curvature of the surface 50 is coincident with the axis of the shaft 23. The outer end 51 of the arm 25 is also of arcuate form located on the same radius as that of the pawl surface 50.

The major portion of the pawl 45 extends from the pivot stud 47 and terminates in the tooth engaging end portion 49. The arm structure is so arranged that the pawl 45 is positioned above the ratchet wheel 20. Accordingly, upon oscillation of the arm 25 about the axis of the ratchet wheel 20, the tooth engaging end 49 of the pawl moves by gravity into engagement with the successive teeth of the ratchet wheel 20. Accordingly, as the arm structure is rotated in a counterclockwise direction, FIGS. 1, 3 and 4, by upward movement of the piston rod 40, the ratchet wheel 20 and shaft 20 are rotated through an arc equivalent to the spacing between two adjacent teeth of the ratchet wheel 20. Upon operation of the cylinder 35, the arm 30 is oscillated between the full line position, FIG. 1, to the dotted line position.

The fluid operated piston and cylinder structure 35 is of conventional form. An arm 57 is fixedly secured to the piston rod 40. An operating rod 58 is fixed to the arm 57 and carries an actuator 60. The valving structure for the cylinder is indicated at 61, the valves therein being operated by a rod 63 to which collars 65, 66 are secured. Upon downward movement of the piston rod, as shown in FIG. 1, the actuator 60 engages the collar 66 shifting the flow of fluid from the upper end of the cylinder to the lower end thereof effecting upward movement of the rod 40 and oscillation of the arm structure 25, 30 to impart rotation to the turbine shaft 10. Upon reaching the upper end of the stroke, the actuator 60 engages the collar 65 to again reverse the flow of fluid to the cylinder 35. With this arrangement, when the valve 70 in the fluid supply line 71 is opened, the cylinder structure will cycle continuously imparting intermittent rotation to the turbine shaft 10.

During operation of the turbine, it is desirable to maintain the pawl 45 out of engaging position with the teeth of the ratchet wheel 20. Referring to FIGS. 1, 3 and 4, an arcuate shoe member 73 is positioned in the cylindrical side wall 12. The inner surface 74 of the shoe is also formed on a radius from the axis of the ratchet wheel 20. The shoe 73 is fixedly secured to a stem 75 extending through the cylindrical wall 12. The outer end portion of the stem is threaded to receive an adjusting nut 77. The inner portion of the bore in the side wall 12 is enlarged to accommodate a helical compression spring 80 encircling the stem 75 and acting against the upper end of the enlarged bore and the shoe 73. Upon loosening the nut 77, the spring 80 serves to yieldingly move the restraining shoe 73 inwardly.

The pawl 45 is so formed, and pivotally attached to arm 25, that the outer arcuate surface 50 on the portion of the pawl, located at the opposite side of the pivot stud 47 to the engaging end 49 of the pawl, extends outwardly from the arcuate end edge 51 of arm 25, as indicated at 85, FIG. 3, when the tooth engaging end portion 49 of the pawl is in engagement with a ratchet wheel tooth.

However, when the restraining shoe 73 is positioned inwardly as shown in FIG. 4, there is sliding engagement between the arcuate end surface 51 of arm 25, the edge surface 50 of the pawl and the surface 74 of the shoe. Accordingly, the entire arcuate surface 50 of the pawl is maintained in position coincident with the arcuate end edge surface 51 of the arm 25. Therefore, as the arm 25 is oscillated by the piston and cylinder structure, the tooth engaging end 49 of the pawl is maintained out of engagement with the teeth of the ratchet wheel 20 regardless of whether the piston rod is in the up or down position. With this arrangement, the pawl 45 is maintained out of engagement with the ratchet wheel during operation of the turbine.

Figure 5:
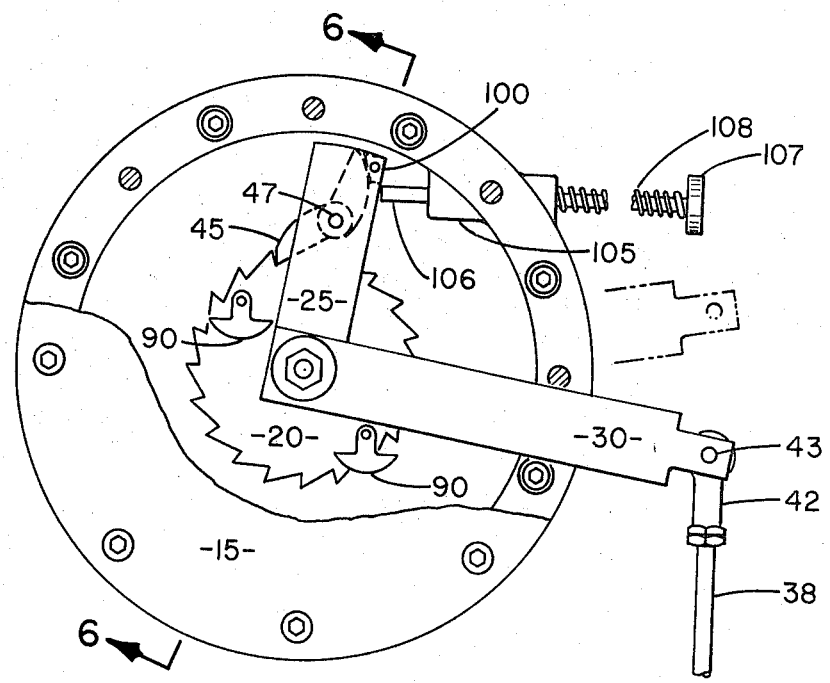
FIG. 5 is a view similar to FIG. 1 showing a modified arrangement for holding the pawl out of ratchet wheel engagement.
Figure 6:
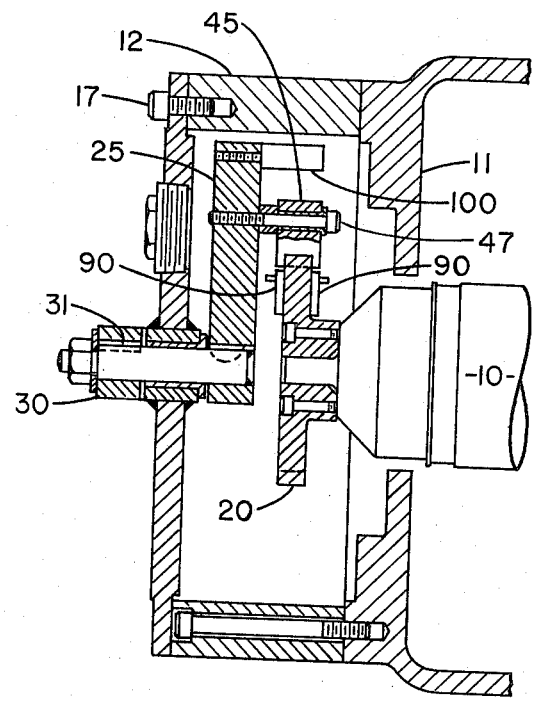
FIG. 6 is a view taken on line 6—6, FIG. 5.

In FIGS. 5 and 6, there is shown a modified form of pawl restraining mechanism. In this arrangement, fly weights 90 are pivotally connected to the ratchet wheel 20. The arm 25 extends radially outwardly beyond the pivot stud 47. A permanent magnet 100 is fixedly secured to the outwardly extending portion of arm 25. If the turbine is started up while the pawl 45 is in ratchet wheel engaging position as shown in full line, FIG. 5, the fly weights 90 will by centrifugal force be moved radially outwardly of the ratchet teeth, striking the pawl and flipping it upwardly into the effective field of the permanent magnet 100. The magnet then serves to maintain the pawl in the outward position free from engagement with the ratchet wheel. Means operable exteriorly of the casing 12 is provided for moving the pawl out of the field of the magnet 100. Referring to FIG. 5, the casing 12 is formed with a boss 105. A stem 106 is slidably mounted in the boss and extends exteriorly of the casing 12. The outer end of the stem is provided with a button 107. A helical compression spring 108 is positioned on the extending portion of the stem and acts between the boss 105 and the button 107 to yieldingly maintain the stem in outward position. Upon manual inward movement of the stem 106, the inner end of the stem contacts the pawl moving it out of the effective field of the magnet 100 for engagement with the ratchet wheel 20 upon operation of the cylinder structure 35.

It will be apparent that the turning structure described is economical to construct and the maintenance of the mechanism is negligible. The mechanism is conveniently supplied from a standby pressurized fluid source which may consist of one or more cylinders highly pressurized with a gas such as nitrogen. With such a standby arrangement, the mechanism may be put into operation regardless of whether there is an electrical power failure.

While for purposes of illustration a preferred embodiment of this invention has been described, it will be apparent that the invention may be otherwise embodied within the scope of the following claims.

I claim:

1. A turning mechanism for intermittently rotating steam turbines subsequent to shutdown comprising a tooth ratchet wheel fixedly secured to the turbine shaft for rotation therewith, an arm extending radially of said ratchet wheel and having an end portion extending outwardly from the periphery of said ratchet wheel, a pawl pivotally mounted on the extending portion of said arm for movement into and out of engagement with the teeth on said ratchet wheel, a powered driver connected to said arm and being operable to effect oscillation thereof about said axis, said pawl being operable upon engagement with said ratchet wheel during oscillation of said arm in one direction to effect rotation of said ratchet wheel and the turbine shaft, a wall encircling said ratchet wheel and said arm, means for restraining movement of said pawl into engagement with the teeth of said ratchet wheel and including an arcuate shoe member carried by said wall and movable into and out of engagement with said pawl, said shoe member being operable upon such engagement to maintain said pawl out of engagement with said ratchet wheel during oscillation of said arm.

2. A turning mechanism according to claim 1 wherein said pawl restraining means includes a permanent magnet fixed to said arm in juxtaposition to said pawl, and means carried by said ratchet wheel and operable upon said turbine shaft and ratchet wheel reaching a predetermined speed of rotation to move said pawl into the effective field of said magnet, said magnet being operable upon said pawl being moved into said effective field to maintain said pawl out of engagement with said ratchet wheel.

3. A turning mechanism according to claim 2 and including reset means mounted in said wall and operable exteriorly thereof to move said pawl out of the effective field of said permanent magnet.

* * * * *